ized.

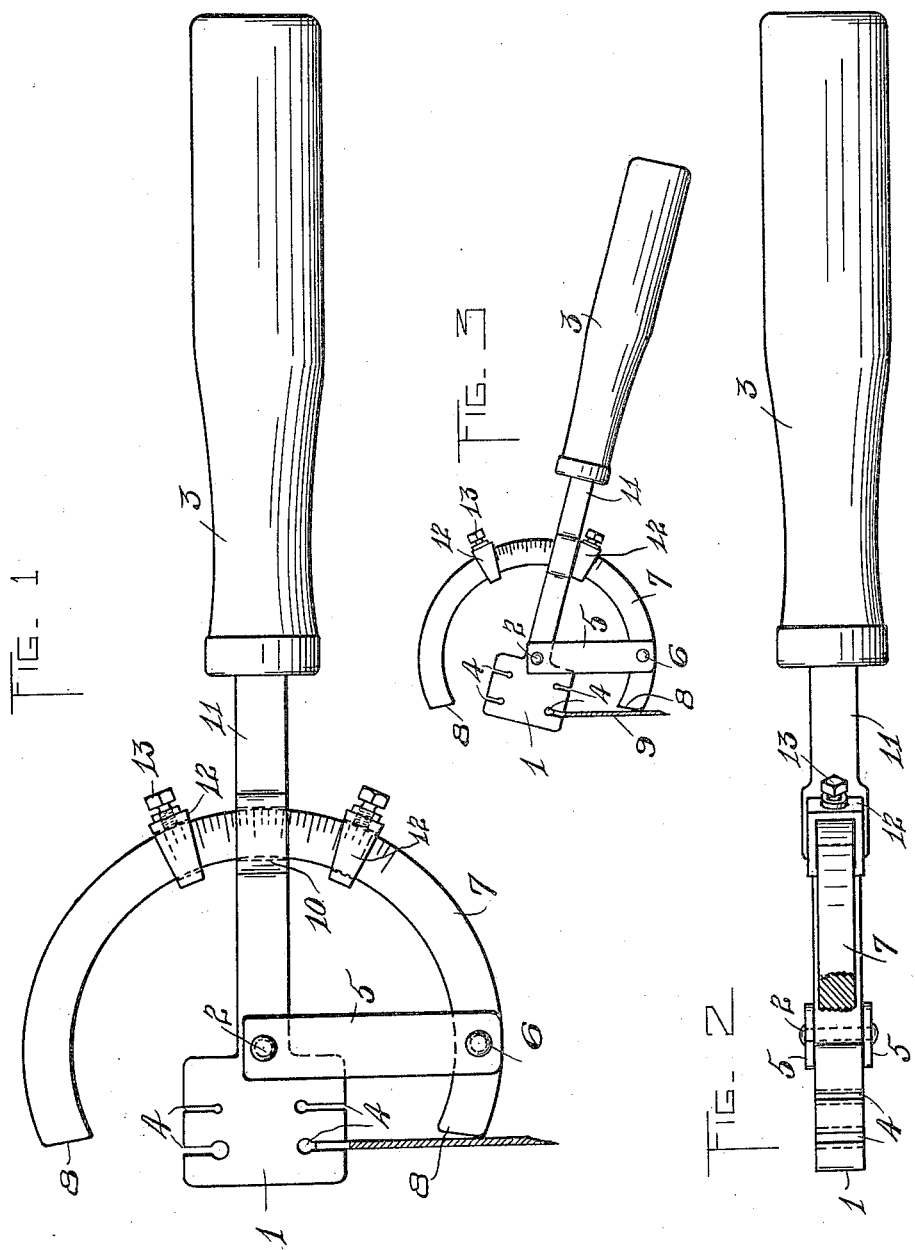

UNITED STATES PATENT OFFICE.

DAVID G. CREAGER, OF LYONS, NEW YORK.

SAW SET.

1,402,921.  Specification of Letters Patent.  Patented Jan. 10, 1922.

Application filed April 9, 1920. Serial No. 372,531.

*To all whom it may concern:*

Be it known that I, DAVID G. CREAGER, a citizen of the United States, and resident of Lyons, in the county of Wayne and State of New York, have invented certain new and useful Improvements in Saw Sets, of which the following is a specification.

The present invention relates to saw sets, and an object thereof is to provide a saw setting device of simple construction having provision which will permit the bending of teeth of saws of different thicknesses. Another object of the invention is to provide a saw setting head having teeth receiving recesses on opposite sides thereof with a supporting frame having two saw abutments, one for use with the saw receiving recesses each side of the saw setting head. A still further object of the invention is to provide an adjustable limiting means which will determine the amount of the bend to be given to the teeth.

To these and other ends, the invention consists of certain parts and combinations of parts all of which will be hereinafter described, the novel features being pointed out in the appended claims.

In the drawings:

Fig. 1 is a side view of a saw set constructed in accordance with this invention, the saw set being shown applied to a saw before the bending of the tooth and the saw being shown in fragmentary section;

Fig. 2 is a view of one edge of the saw set; and

Fig. 3 is a view similar to Fig. 1 showing the position of the parts when the saw set has bent a tooth.

Referring more particularly to the drawings, 1 indicates a saw setting head mounted at 2 on a suitable frame and having a handle 3 rigidly secured thereto. This saw setting head in this instance has, on opposite sides of its pivot, two sets of saw receiving notches or recesses 4, said notches or recesses being of different widths to accommodate saws of different thicknesses. The frame on which the head is pivotally mounted preferably embodies two plates 5 arranged in spaced relation and having the head 1 pivoted between them. These plates are secured preferably rigidly at 6 to a curved member 7, this member being substantially concentric with the axis of turning 2 of the head 1 and having its ends 8 serving as abutments for engaging the saw 9 below the teeth in the manner shown in Figs. 1 and 3. One of these abutments engages the saw body when the saw receiving notches on one side of the head are employed, while the other abutment engages the saw body when the saw receiving notches on the other side of the head are employed.

Means may be provided for limiting the movement of the head 1 about the pivot 2 on the supporting frame, and with this purpose in view the curved member 7 is preferably extended through an opening 10 in the shank portion 11 of the handle and on this member 7 two stops 12 may be arranged. It is preferred to make these stops adjustable, and to this end they are in the form of collars fitting about the member 7 and secured in their adjusted positions by set screws 13. One of these stops is brought into action when one of the abutments 8 engages the saw 9, while the other stop is effective when the other abutment 8 engages the saw 9. Divisions may be provided on the member 7 with which the stops may cooperate in order to show the amount of bending to be given to the teeth.

In the use of the tool, the saw receiving notch or opening 4 is selected to correspond to the thickness of the saw and is fitted over the tooth in the manner shown in Fig. 1, the stop 12 below the handle shank 11 being positioned on the member 7 at such a point that the proper amount of bending in the teeth will take place when the shank reaches such stop. Should the tooth spring back any appreciable degree after being bent, this will be noticed by movement of the handle shank 11 away from the stop 12, and in this event the tooth is bent until it remains set at the proper angle. This gauging function of the saw set eliminates the necessity of using a separate gauge for determining that the teeth have all been set to the same degree.

From the foregoing it will be seen that there has been provided a saw set having saw receiving notches on opposite sides thereof. The supporting frame is employed on which the saw setting head is pivotally mounted and which has two abutments arranged on opposite sides of the pivot, one for the saw receiving notches on one side of the head and the other for the saw receiving notches on the other side of the head. Stopping means is employed for limiting or defining the movement of the saw setting head on the supporting frame. The scale on the gage also determines the amount of the back spring on the tooth and if any tooth springs back further than the others, as determined by the scale, then it is again reset until the back spring is equal on all the teeth.

What I claim as my invention and desire to secure by Letters Patent is:—

1. A saw set comprising a frame having two abutments and a bending head loosely pivoted between said abutments and having saw receiving notches on opposite sides the head cooperating with one abutment for the notches on one side thereof and with the other abutment for the notches on the opposite side.

2. A saw set comprising a frame having a curved member provided with saw abutments at opposite ends, and a saw bending head loosely pivotally mounted on the frame and having saw receiving notches on opposite sides thereof, the bending head cooperating with one abutment for the notches on one side and with the other abutment for the notches on the other side.

3. A saw set comprising a saw setting head having a saw tooth receiving notch, a handle extending from said head with its length lying transversely of the tooth receiving notch, a portable frame having a loose connection with the head on the side of the notch nearest the handle, said frame being mounted to shift with the head after the latter is fitted to the different teeth, and an abutment connected with the frame and bearing loosely against that side of the saw on which the handle lies when a tooth of the saw is in the notch.

4. A saw set comprising a saw setting head having a saw tooth receiving notch, a handle extending from said head with its length lying transversely of the tooth receiving notch, a portable frame having a loose connection with the head on the side of the notch nearest the handle, said frame being mounted to shift with the head after the latter is fitted to the different teeth, an abutment connected with the frame and bearing loosely against that side of the saw on which the handle lies when a tooth of the saw is in the notch, and a stop adjustable on the frame for limiting the movement of the head with reference to the frame.

5. A saw set comprising a curved member forming abutments at opposite ends, a tooth bending head loosely pivoted on said curved member between said abutments and having tooth receiving notches on opposite sides thereof, said head cooperating with one of the abutments for the notches on one side and with the other abutment for the notches on the opposite side, and two stops adjustable on said curved member to limit the movement of the tooth bending head on its pivot.

DAVID G. CREAGER.